H. F. SCHRODER.
PAN FOR EVAPORATING SUGAR.
No. 60,564.  Patented Dec. 18, 1866.
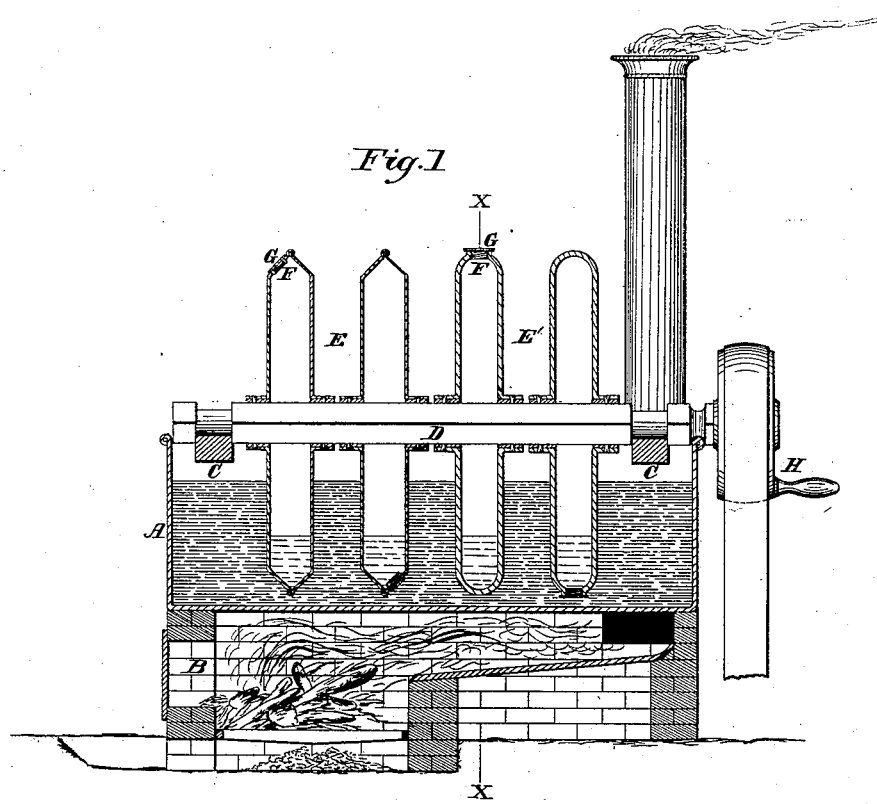
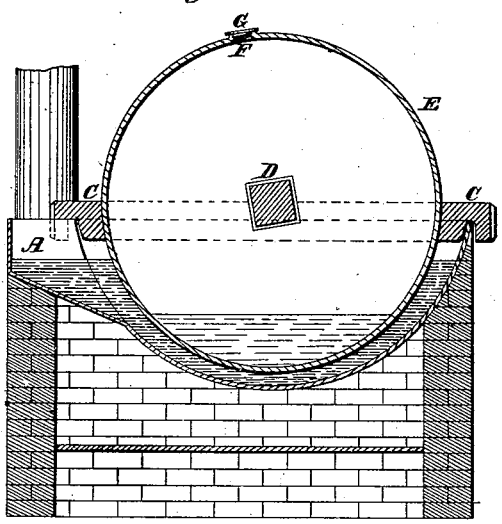
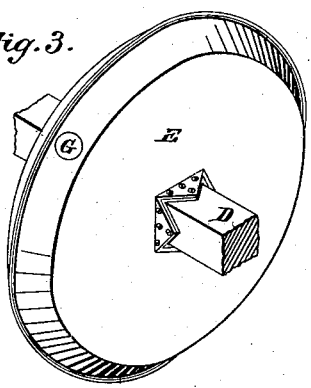

United States Patent Office.

IMPROVEMENT IN PANS FOR EVAPORATING SUGAR.

HERMAN F. SCHRODER, OF CINCINNATI, OHIO.

Letters Patent No. 60,564, dated December 18, 1866.

*The Schedule referred to in these Letters Patent and making part of the same.*

TO WHOM IT MAY CONCERN:

Be it know that I, HERMAN F. SCHRODER, of Cincinnati, Hamilton county, Ohio, have invented a new and useful Evaporating and Granulating Attachment for Sugar Pans; and I do hereby declare the following to be a full, clear, and exact description thereof, reference being had to the accompanying drawings, making a part of this specification.

This invention relates to a mechanical contrivance for use in connection with an ordinary sugar-boiling kettle or pan for the purpose of expediting the processes of desiccation and granulation.

Figure 1 is a longitudinal section; and

Figure 2, a transverse section of a sugar pan or kettle, provided with my evaporator, taken at the line X X.

Figure 3 is a perspective view of the evaporating disks.

A may represent an ordinary pan or kettle, such as used by farmers. B is a furnace under the same. A frame, C, adapted to set upon the top of the pan, affords journal bearing for the shaft D of one or more hollow disks E E', each of which has a mouth, F, closed by a steam-tight cap, G. The disks may be rotated by means of a crank, H, or by a belt and pulley. Each disk, being supplied with water equal to about one-eighth of its capacity, is closed tightly, and lifted bodily into the pan. The heat, communicated from the boiling sirup through the sides of the disks, will cause a partial evaporation of the water therein, (enough to fill the disk with steam,) which will operate to heat up the entire disk to the temperature of the sirup. The operator then rotates the disks slowly around, so as to lick up and expose to atmospheric contact successive particles of the sirup, causing a rapid evaporation of the watery portion, and corresponding desiccation of the sirup; and, finally, greatly expediting the granulation of the sugar itself. The hollow disks may be of sheet iron, as at E, or of cast iron, as at E'. I am aware that sirup has heretofore been proposed to be heated by steam disks rotating within it, but such apparatus involves the use of a separate steam generator and a costly arrangement of pipes, cocks, stuffing-boxes, hollow shafts, &c., for introducing steam and discharging surplus water, which have rendered it inapplicable to the use of a farmer or planter. My device, on the contrary, is only capable of use in conjunction with a sugar pan of customary construction, heated over an ordinary sugar furnace. It will be seen that the disks in my improvement form no part of the heating apparatus, the duty of heating being performed wholly by the customary furnace; and that each disk is an hermetically-closed vessel, attached to a solid shaft. My evaporator may be attached to any common evaporating pan or kettle without material change of the vessel or furnace.

I claim herein as new, and of my invention—

The provision of one or more hollow disks, adapted to receive water, and be hermetically closed; the said disks being adapted for attachment to a common evaporating pan or kettle, and having a crank, or other means of rotation, as and for the purposes set forth.

In testimony of which invention I hereunto set my hand.

H. F. SCHRODER.

Witnesses:
  GEO. H. KNIGHT,
  JAMES H. LAYMAN.